Figure 3:
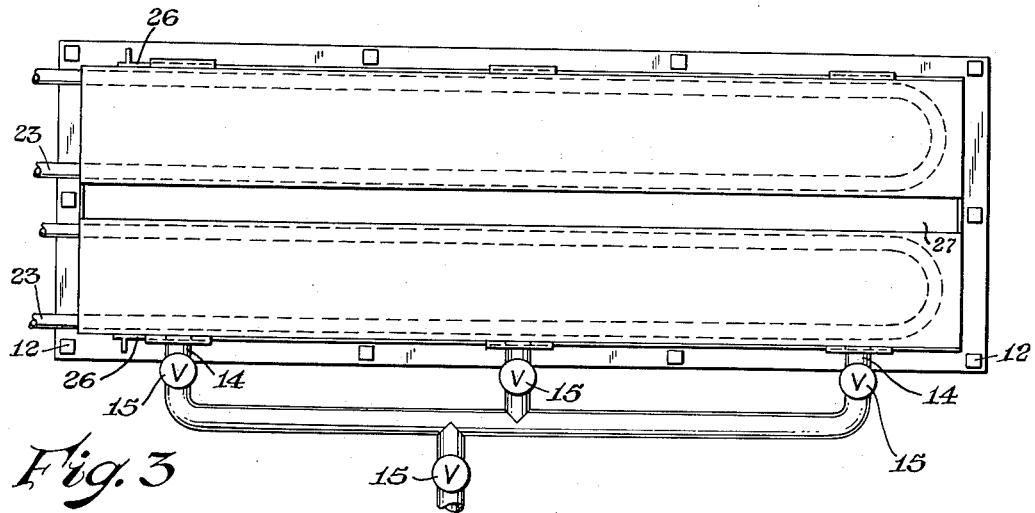

Jan. 3, 1956   W. C. JONES   2,729,194
APPARATUS FOR DUSTING PLASTIC FILM AND LIKE SHEET MATERIAL
Filed Nov. 19, 1954   2 Sheets-Sheet 1
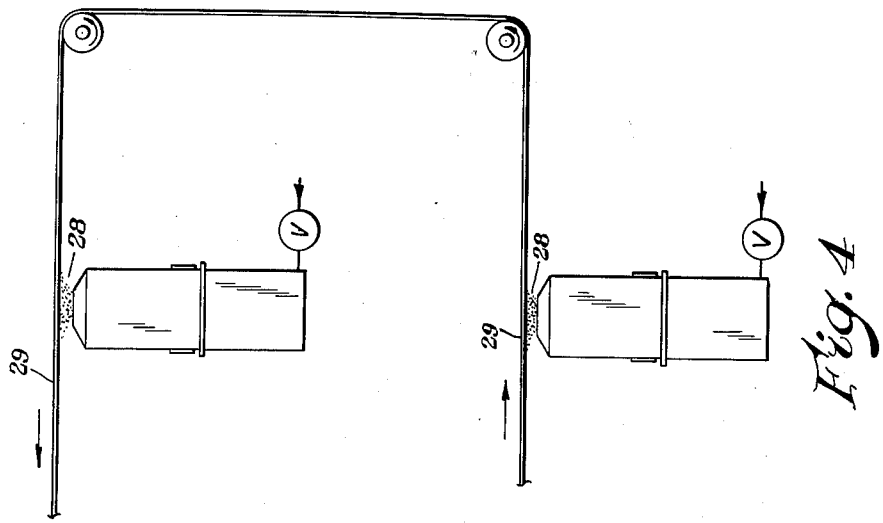
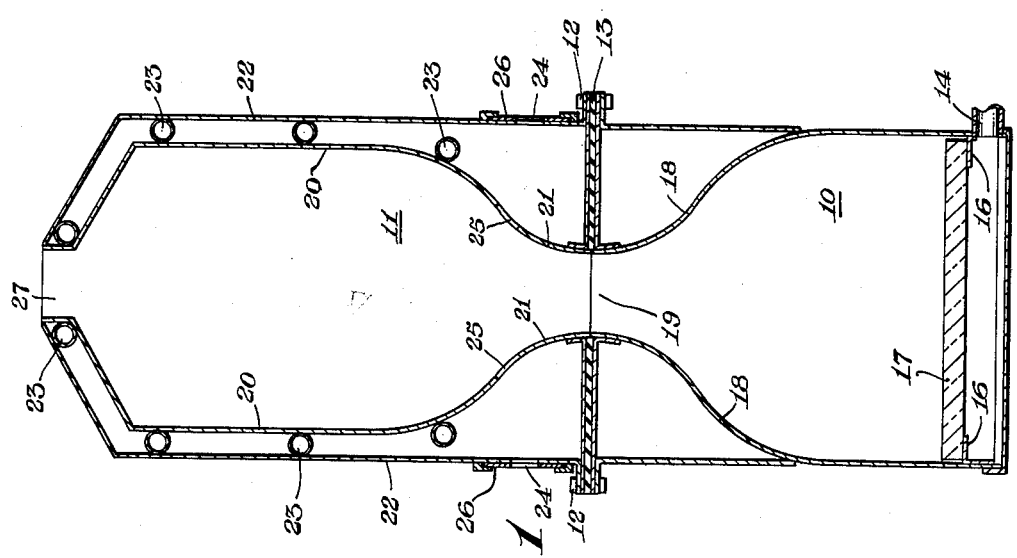
INVENTOR.
William C. Jones
BY
Griswold & Burdick
ATTORNEYS INVENTOR.
William C. Jones
BY
Griswold & Burdick
ATTORNEYS

United States Patent Office 2,729,194
Patented Jan. 3, 1956

2,729,194

APPARATUS FOR DUSTING PLASTIC FILM AND LIKE SHEET MATERIAL

William C. Jones, Midland, Mich., assignor to The Dow Chemical Company, Midland, Mich., a corporation of Delaware Application November 19, 1954, Serial No. 469,925

2 Claims. (Cl. 118—308)

This invention relates to apparatus for supplying a uniform coating of powdered material to the surface of plastic films or other sheets, especially to reduce the electrostatic cling which is characteristic of many such sheets.

It is well known that many types of sheet material, especially those comprising synthetic plastics, are highly dielectric, and that such sheets have a normal tendency to cling to other similar sheets. It is also known that this clinging tendency is aggravated, due to the accumulation of an electrostatic charge, by such operations performed on the sheet as winding it on or off of storage rolls, or other operations in which the sheet surface is subjected to friction.

It has been proposed heretofore, and it has been the normal practice, to apply an anti-sticking agent to such surfaces to reduce the clinging tendency. Numerous powders or dusts have been proposed and used, the choice in a given instance depending largely on the intended use of the treated sheet. Plastic films intended for use as food wrappers are commonly dusted with starch. For sheets intended for industrial or non-food uses, such other agents as talc, mica, various polymer powders, and assorted chemicals with anti-static properties have been used. Such powders have been applied to the surface of the dielectric sheet by such means as sifting or aspirating the powder from a continuously diminishing supply. Such methods necessarily result in the deposition of varying doses of the powder per unit area of the sheet surface. Consequently, the extent to which the clinging tendency is overcome has varied according to the amount of powder remaining in the duster at the moment each area is treated. More uniform and controllable results are desired.

It is the principal object of this invention to provide apparatus for supplying dust to a dielectric sheet surface, capable of delivering the dust to such surface at a controlled rate which is independent of the remaining inventory of dust in the apparatus. Related objects may appear hereinafter.

The apparatus of the present invention has a lower chamber and an upper chamber communicating with one another through a constricted venturi-type throat. Both chambers are narrow, and are of a length corresponding to the width of the widest sheet to be dusted. The lower chamber has a transverse plate of uniform but low porosity securely seated a small distance above the bottom of the chamber and covering the entire cross-sectional area of the chamber. Below said plate there is at least one opening into the chamber for air or other inert gas under pressure. The upper chamber is jacketed and controllable means are provided for heating it. The base of the jacket of the upper chamber is perforated at intervals along each of the longer sides of the apparatus and a similarly perforated strip is mounted in sliding relation over these openings to serve as a throttle or damper. The inner wall of the upper chamber is perforated in like manner along lines near the base of the chamber above the venturi constriction. The upper chamber is constricted at the top to provide a narrow elongated opening through which dust can be discharged upwardly toward sheet material drawn past that opening.

In operation, the lower chamber is partially filled with the desired dusting agent, the upper chamber is heated; the whole apparatus is disposed with its longitudinal axis transverse to the course of travel of the sheet to be dusted and with the elongated top opening generally from 0.5 to 6 inches below the plane of travel of the sheet; air is admitted below the porous plate under sufficient pressure to fluidize the bed of powder and to carry some of the powder up into the constricted throat-like passageway; and the dampers are opened sufficiently at the base of the upper chamber to create upwardly directed convection currents of atmospheric air to carry the dust through the upper chamber and out of the elongated discharge opening. For each such apparatus, the rate of discharge of dust is dependent on the pressure at which air is supplied below the porous plate, the porosity of the plate, the density and degree of fineness of the dust, the temperature of the upper chamber, and the velocity of the induced draft through that chamber. All of these factors, except the porosity of the plate in the lower chamber, are controllable at will to provide any desired rate of discharge which is independent of the remaining inventory of dust in the lower chamber. Hence, uniformity of dusting is readily achieved.

Figure 2:
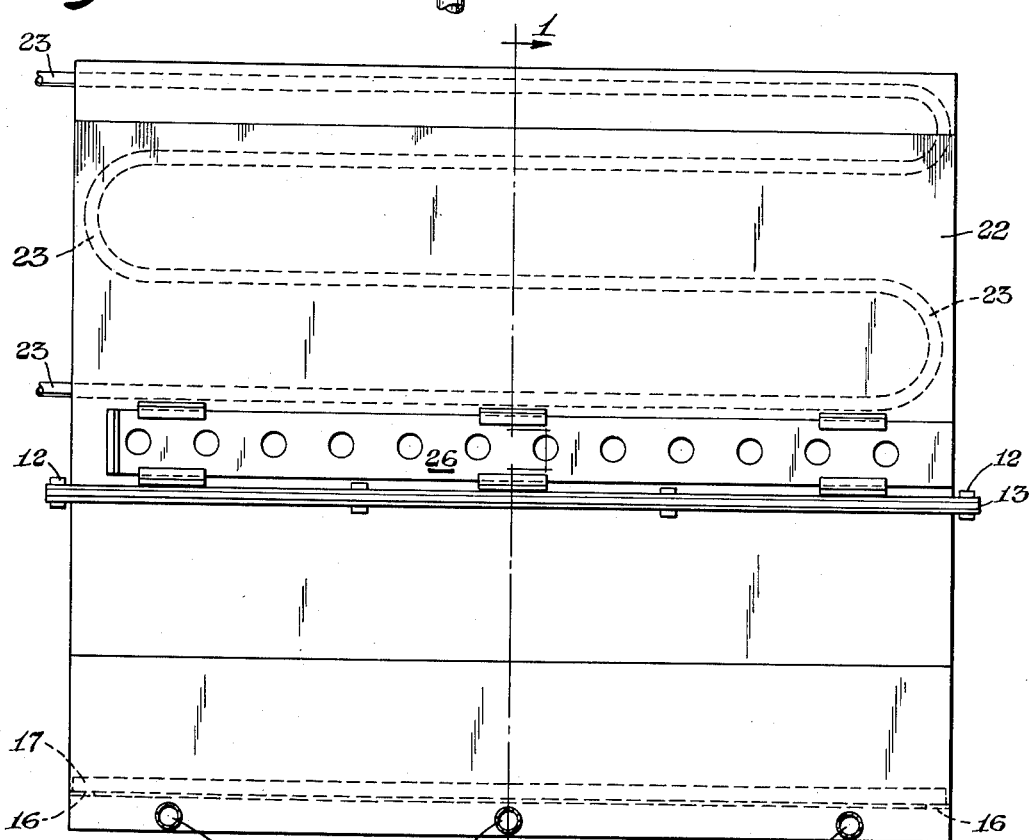

The invention will be described with respect to a preferred embodiment of the apparatus as shown in the accompanying drawings, wherein:

Fig. 1 is a vertical cross-section through the apparatus;
Fig. 2 is a side elevation thereof;
Fig. 3 is a top plan of the apparatus; and
Fig. 4 is a diagrammatic representation of a scheme for dusting both sides of a dielectric sheet with the apparatus.

The lower chamber 10 and the upper chamber 11 may be made most conveniently as separate items, and they are illustrated as being joined by bolts 12 at a gasketed flanged union 13. The lower chamber 10 is provided with one or more inlets 14 for air or gas under pressure. The flow of such gas may be controlled as by valves 15 (Fig. 3). A short distance above the air inlet port or ports 14 are horizontal flanges 16 to support a transversely disposed porous plate 17 having substantially uniform porosity and preferably a low permeability. Plate 17 may be made of porous clay or other ceramic, or it may be of sintered glass or of pressed powdered metal. The upper side walls 18 of chamber 10 converge smoothly and symmetrically to a relatively constricted opening 19, suitably about one-fourth the width of chamber 10.

The upper chamber 11, which may have a slightly smaller maximum width between its internal parallel upper side walls 20 than the corresponding width of lower chamber 10, has smoothly and symmetrically divergent lower side walls 21 extending from a mating relationship with the upper extremities of walls 18 of the lower chamber 10 to the parallel vertical sidewalls 20, forming a venturi throat 19. A jacket 22 is mounted externally on each side of chamber 11, and heating means, such as steam coils 23, are provided in the jacketed space. A plurality of perforations 24, preferably evenly spaced, are provided through the jackets 22 just above the flanged union 13, and similar perforations 25 are provided in the outwardly flaring walls 21 near the base of chamber 11. A suitable damper 26, illustrated as a perforated strip, is mounted over each row of perforations 24 on the outer jackets 22, providing slidable means for throttling the flow of air through perforations 24. The upper walls of chamber 11 converge toward a longitudinally disposed outlet port 27, suitably of about the same width as that of the venturi throat 19.

In preparation for operation, the apparatus is assembled and a charge of the dusting material is delivered through throat 19 to the lower chamber 10, resting on the porous plate 17. The upper chamber 11 is heated, suitably by passing steam at 150 p. s. i. through coils 23. Air is admitted through valves 15 under sufficient pressure to fluidize the powder in chamber 10 and carry it into throat 19. Dampers 26 are opened gradually until the amount of induced air draft through perforations 24 and 25 is sufficient to carry the powder at a steady rate through outlet port 27, from which it emerges at low velocity as an air-borne cloud 28. The apparatus is disposed a short distance, usually within 6 inches, below the horizontal path of a traveling dielectric sheet 29, such as a plastic film, and the dust is distributed evenly over the film surface, being attracted thereto by the electrostatic charge on the sheet.

I claim:

1. Apparatus for emitting a cloud of dust particles at a controllable rate comprising two interconnected superposed chambers, the upper side walls of the lower chamber and the lower side walls of the upper chamber converging smoothly and symmetrically to an interconnecting venturi throat between said chambers; a porous plate disposed transversely across the lower chamber near the bottom thereof dividing said chamber into two compartments; an inlet port in the lowermost compartment for admitting inert gas under pressure beneath said porous plate; a jacket about the upper chamber, means in said jacket for heating said upper chamber; a plurality of spaced perforations along a horizontal line on each side of the apparatus through the jacket at a level just above that of the venturi throat; a plurality of spaced perforations along a horizontal line through the walls of the upper chamber above the venturi throat; damper means associated with the perforations in the outer jacket to regulate the draft therethrough; a narrow elongated outlet port at the top of the upper chamber; means for supplying gas under pressure to the compartment beneath the porous plate; and a supply of finely divided dusting material in the compartment of the lower chamber above said porous plate.

2. Apparatus for reducing the cling tendency of plastic film and similar dielectric sheet material comprising the dusting apparatus claimed in claim 1 and means for moving such sheet material in a horizontal plane within six inches above the outlet port of said dusting apparatus, the direction of travel of the sheet being at right angles to the major axis of the said elongated outlet port.

References Cited in the file of this patent

UNITED STATES PATENTS

| | | |
|---|---|---|
| 2,123,537 | Marr | July 12, 1938 |
| 2,602,418 | Paasche | July 8, 1952 |
| 2,633,824 | Dunn et al. | Apr. 7, 1953 |
| 2,636,642 | Gorin | Apr. 28, 1953 |